(12) United States Patent
Braad

(10) Patent No.: US 6,273,142 B1
(45) Date of Patent: Aug. 14, 2001

(54) FLEXIBLE PIPE WITH AN ASSOCIATED END-FITTING

(75) Inventor: Poul Erik Braad, Birkerod (DK)

(73) Assignee: NKT Flexibles I/S, Brondby (DK)

( * ) Notice: Subject to any disclaimer, the term of this patent is extended or adjusted under 35 U.S.C. 154(b) by 0 days.

(21) Appl. No.: 09/529,486

(22) PCT Filed: Oct. 14, 1997

(86) PCT No.: PCT/DK97/00450

§ 371 Date: Jul. 3, 2000

§ 102(e) Date: Jul. 3, 2000

(87) PCT Pub. No.: WO99/19654

PCT Pub. Date: Apr. 22, 1999

(51) Int. Cl.[7] .................................................. F16L 11/00
(52) U.S. Cl. ........................ 138/109; 138/155; 285/222.1
(58) Field of Search ................................. 138/109, 135, 138/120, 155; 285/222.1

(56) References Cited

U.S. PATENT DOCUMENTS

| | | | |
|---|---|---|---|
| 959,187 | 5/1910 | Witzenmann | ..................... 285/222.1 |
| 4,275,769 | * 6/1981 | Cooke | ................................... 138/109 |
| 4,813,715 | * 3/1989 | Policelli | ............................ 138/109 X |
| 4,875,717 | * 10/1989 | Policelli | ............................ 138/109 X |
| 4,895,185 | * 1/1990 | Champleboux et al. | ............ 138/109 |

FOREIGN PATENT DOCUMENTS

| | | |
|---|---|---|
| 225 220 | 9/1910 | (DE) . |
| 810 452 | 8/1951 | (DE) . |
| 891 611 | 3/1962 | (GB) . |

* cited by examiner

*Primary Examiner*—Patrick Brinson
(74) *Attorney, Agent, or Firm*—McCormick, Paulding & Huber LLP

(57) ABSTRACT

An assembly of an end-fitting (9) and a flexible pressure pipe which is of a non-bonded structure and comprises a number of layers including at least one layer having a number of helically wound flat metallic tensile armor wires with end parts which, in the assembled condition, are embedded in an anchor consisting of a casting material such as epoxy which is injected into a cavity formed in the end-fitting. The flat wire end parts have at least one twist turning generally around the centerline of the wire. Said twists lock the tensile armor wires firmly in the anchor and therefore provide a greater resistance to axial tensile loads acting on the assembly than has been known before. Furthermore the joint is a simple and cheap structure and can be made in situ.

10 Claims, 3 Drawing Sheets

FLEXIBLE PIPE WITH AN ASSOCIATED END-FITTING

BACKGROUND ART

The invention concerns a flexible pressure pipe with an associated end-fitting having an axially extending through opening, where the pipe is of a non-bonded structure comprising a number of layers including an extruded polymer inner lining extending into the through opening.

Flexible pressure pipes are used for a variety of applications, including water supply lines, sewage lines and lines for transporting chemicals such as liquid ammonia and phosphoric acid and also high pressure offshore flexible pipes for the oil and gas industry.

The joint between the inner lining and the end-fitting must be able to resist the axial tensile load acting on the inner lining, when the flexible pipe is descending over a great length, and also such stresses which arise as a consequence of temperature fluctuations.

Conventionally, said joint is provided by squeezing the inner lining between an outer conical ring and an inner conical ring which is pressed in between the inner lining and the carcass of the pipe. The effect of this squeezing will, however, diminish gradually as the plasticizer disappears from the plastic material of the lining.

Another drawback is that temperature stresses can arise in the joint because the plastic material has a high coefficient of expansion.

In the document GB 891 611 A is described a tamberproof fitting for attachment to the end of a hose having a liner of substantially plastic material with a braided covering thereon. By assembling, an end of the liner is squeezed between an inner nipple and an outer body member having, on the innerside, sharp ribs which by the squeezing is forced into the material of the liner forming complementary share grooves in the liner. This known technique cannot be used for pipes having an inner carcass which not allows the liner to be squeezed and the nipple to be screwed in. Furthermore, the share grooves in the liner functions with a dangerous notch effect which is not acceptable for high-quality flexible pressure pipes exposed to high loads.

SUMMARY OF THE INVENTION

The object of the invention is to provide a flexible pressure pipe with an associated end-fitting of the type mentioned in the opening paragraph in which the joint between the inner lining of the pipe and the end-fitting is a simple and cheap structure and provides a greater resistance to axial tensile loads acting on the inner lining than has been known before.

This is achieved in that on the outer surface of the end part of the inner lining at least one annular groove is formed, a lock ring is attached to the inner lining by means engaging said annular groove, and the lock ring is attached to the end-fitting, whereby the inner lining can be firmly connected to the end-fitting in a simple and time efficient manner.

The lock ring can be attached to the annular groove in the inner lining by a substantially corresponding annular rib on the inner surface of the lock ring. This embodiment is very simple.

To compensate for inevitable tolerances of the inner lining and in the preparation of the joint between the lining and the lock ring, in another expedient embodiment the lock ring can be attached to the annular groove in the inner lining by a circlip which is fitted into both said annular groove in the inner lining and an opposing groove in the inner surface of the lock ring.

A particularly strong connection between the inner lining and the lock ring is obtained when the annular groove in the outer surface of the inner lining is formed by rolling, such that the material of the lining will be strengthened and imparted with a better structure by cold hardening.

For improving the strength of the joint between the lock ring and the inner lining, the annular groove in the outer surface thereof can be formed as a segment of circle and the depth of the groove can be between 0.2–0.5 times the thickness of the lining.

The lock ring can easily be mounted on the inner lining when it has a transverse slit or consists of two or more sectors of a circle.

In a particularly advantageous and strong embodiment, the lock ring can be fitted into a holding groove formed in the wall of the through opening of the end-fitting, and for securing this connection between the lock ring and the holding groove there may be a gap filled with a casting material, e.g. a polymer such as epoxy.

The invention also concerns a method for assembling a flexible pressure pipe with an associated end-fitting having an axially extending through opening, where the pipe is of a non-bonded structure comprising of a number of layers including an extruded polymer inner lining extending into the through opening. Said method comprises: removing the layers surrounding the lining at the end of the pipe, rolling at least one annular groove in the outer surface of the end part of the inner lining, placing a lock ring consisting of two or more sectors of a circle around the end part of the lining such that a rib on the lock ring, or a circlip which engages a groove in the lock ring, engages the groove rolled in the outer surface of the end part of the lining, securing the lock ring sectors, and attaching the lock ring to the end-fitting. The method can advantageously be performed in situ.

BRIEF DESCRIPTION OF THE DRAWINGS

The invention will be explained more fully in the following description, given by way of example, with reference to the drawings, in which.

DETAILED DESCRIPTION OF PREFERRED EMBODIMENTS

Figure 1:
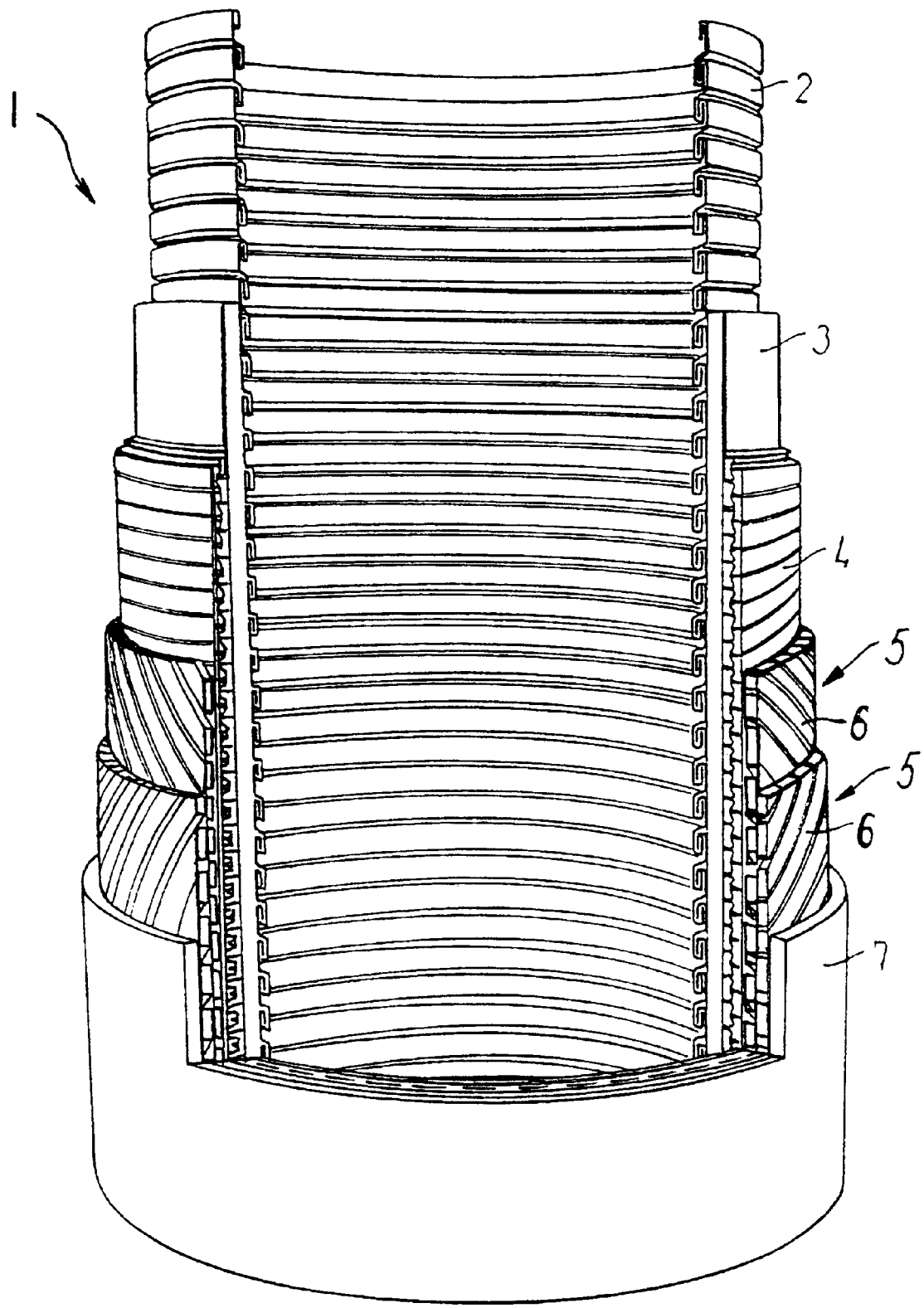
FIG. 1 shows, partly in axial section, a typical flexible pressure pipe.

FIG. 1 shows a flexible pressure pipe, which is generally designated by 1. The pipe is of a non-bonded structure comprising a number of layers which in this embodiment are:

a carcass 2 of an interlocking structure made from metallic strips. The carcass serves, in the main, to prevent collapse of the pipe due to pipe decompression, external pressure, tensile armour pressure and mechanical crushing loads, an inner lining 3 in the form of an extruded polymer layer for providing internal fluid integrity, a pressure armour 4 in the form of structural layers consisting of helically wound C-shaped metallic strips with a high lay angle, a tensile armour 5 consisting of a pair of helically counter wound flat metallic tensile wires 6 with a lay angle typically between 20° and 60°. The tensile armour serves to provide resistance to axial tensile loads, and an outer sheath 7 in the form of an extruded polymer for shielding the structural elements of the pipe from the outer environment and providing mechanical protection.

Figure 2:
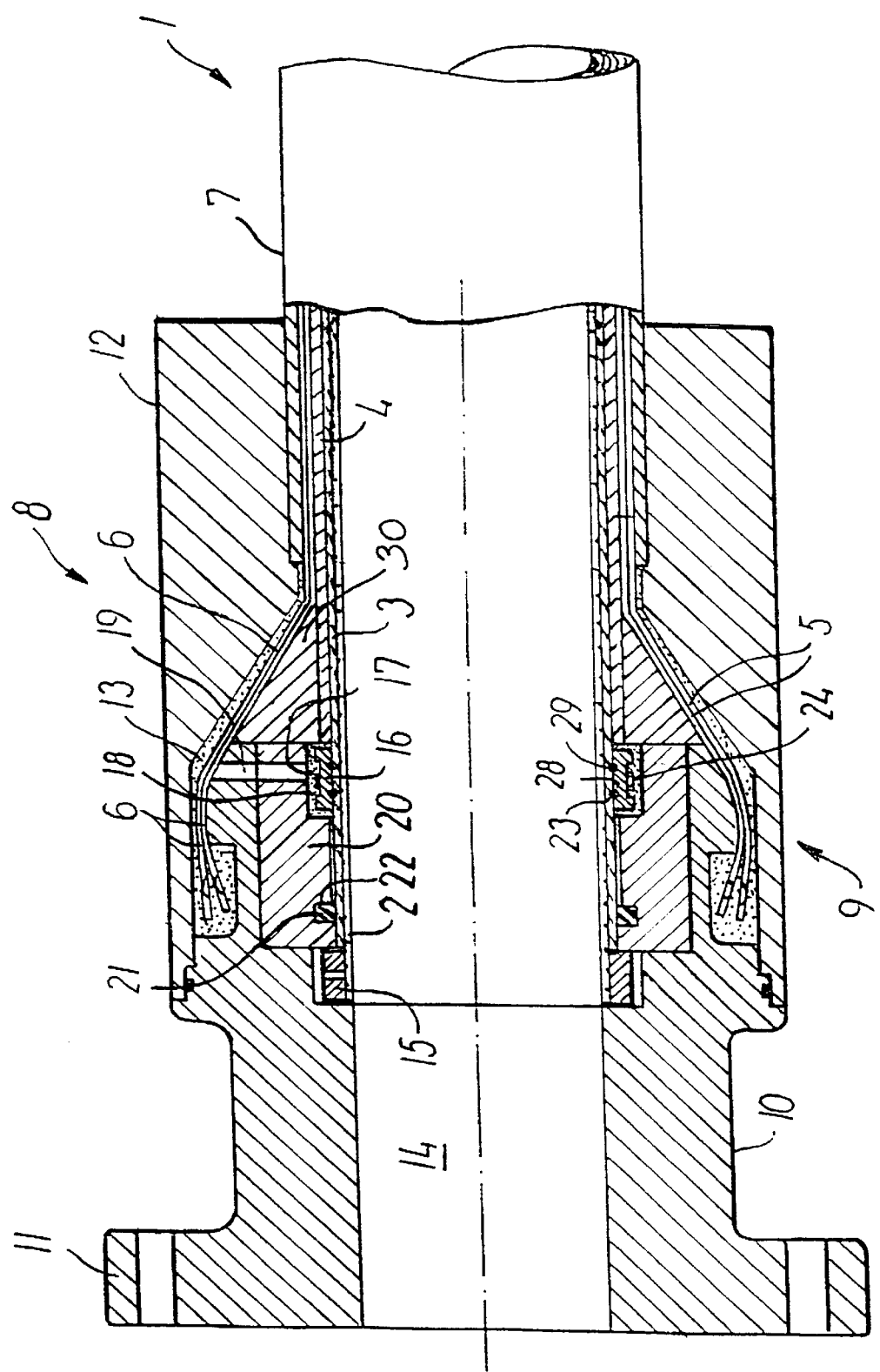
FIG. 2 shows, in axial section, an assembly of the flexible pressure pipe shown in FIG. 1 and an end-fitting.

FIG. 2 shows an assembly 8 of an end-fitting 9 and the flexible pressure pipe 1. The end-fitting 9 forms the transition between the pipe and the connector and for this purpose has a first part 10 with a connection flange 11, a second part 12, and a third part 30. The three parts 10; 12; 30 delimit a cavity 13 which partly is substantially cone-shaped. The end-fitting 9 has furthermore a through opening 14 for accommodating an end of the pipe 1.

When assembling the flexible pressure pipe 1 with the end-fitting 9 the flat metallic wires 6 of the tensile armour 5 are led into the cavity 13 in the end-fitting and a casting material, e.g. epoxy, is injected into the cavity making an anchoring for the wires.

The carcass 2 is fastened to the end-fitting 9 by means of a lock nut 15, and to the inner lining 3 by means of a lock ring 16 fitting into an annular groove 17 in the wall of the through opening 14. The lock ring 16 is in the embodiment shown secured in the groove 17 by a casting material 18, e.g. epoxy, which is injected through a hole 19.

A ring 20 provides a stop for the lock nut 15. In the embodiment shown a sealing ring 21 for tightening the end-fitting 9 and the inner lining 3 is fitted into a groove 22 in the ring 20.

After having removed the layers 4, 5, 7 surrounding the lining at the end of the pipe, two annular grooves 23 are rolled in the outer surface of the end part of the inner lining, whereafter the lock ring 16, which consists of one or more sectors of circle, is placed around said end part and secured with a clamp 24.

Figure 3:
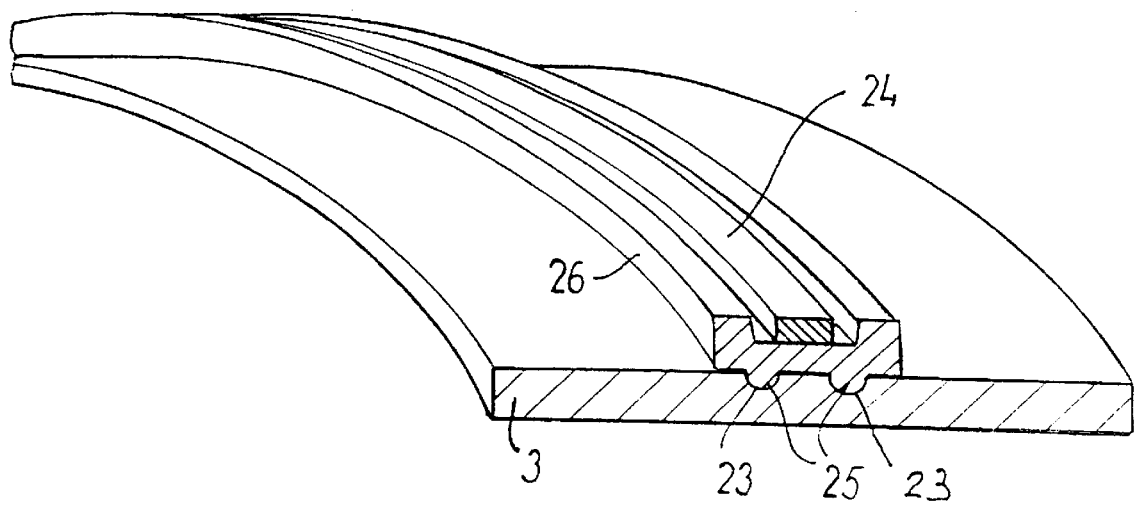
FIG. 3 is a perspective view on an enlarged scale of a part of a first embodiment of a lock ring mounted on an inner lining of the flexible pipe shown in FIG. 1.

In the embodiment shown in FIG. 3 two annular ribs 25 are formed on the inner surface of the lock ring 26. The ribs 25 correspond to the annular grooves 23 rolled in the inner lining 3 and therefore engage these grooves firmly.

Figure 4:
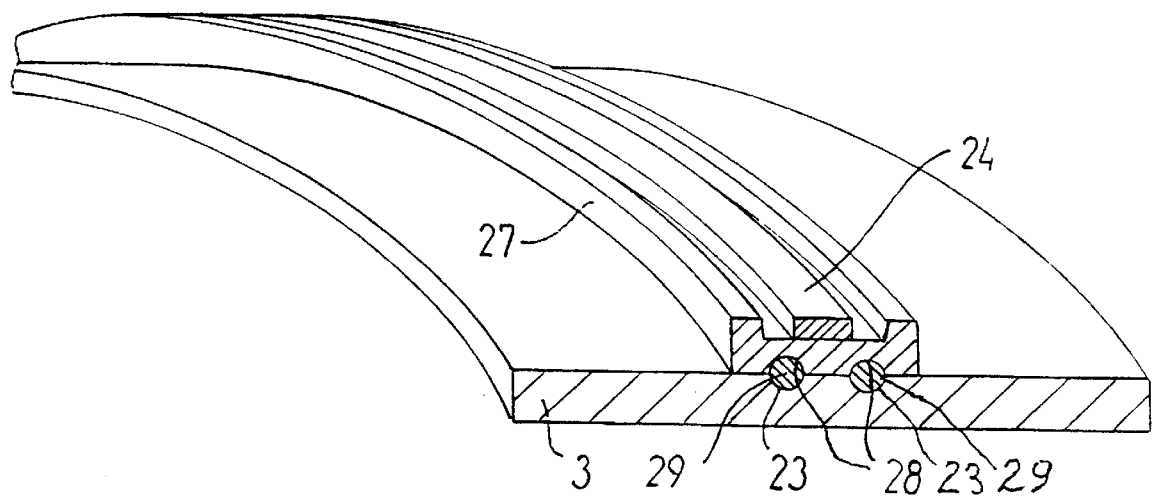
FIG. 4 is a perspective view on an enlarged scale of a part of a second embodiment of a lock ring mounted on an inner lining of the flexible pipe shown in FIG. 1.

FIG. 4 shows another embodiment of a lock ring 27 according to the invention. In this case two annular grooves 28 are formed on the inner surface of the lock ring 27 and two circlips 29 simultaneously engage the grooves 28 formed in the lock ring and the groove 23 rolled in the inner lining 3. This construction can advantageously compensate for tolerances which are caused by the manufacturing of the inner lining and the lock ring.

Having thus provided a general discussion, and specific illustrations by way of examples it is to be understood that no undue restrictions are to be imposed by reason thereof. Many other embodiments are imaginable within the scope of the invention. The specific locking, according to the invention, between the inner lining 3 of the flexible pressure pipe 1 and the end-fitting 9 can also be used in combination with other constructions of the joint between the end-fitting 9 and the tensile armour wires 6 and the carcass 2, respectively, in addition to those described above and shown in the figures.

What is claimed is:

1. A flexible pressure pipe with an associated end-fitting (9) having an axially extending through opening (14), where the pipe is of a non-bonded structure comprising of a number of layers including an extruded polymer inner lining (3) extending into the through opening, wherein on the outer surface of the end part of the inner lining (3) at least one annular groove (23) is formed, a lock ring (16) is attached to the inner lining (3) by means engaging said annular groove (23), and the lock ring (16) is attached to the end-fitting (9).

2. A flexible pressure pipe according to claim 1, wherein the engagement means for attaching the lock ring (16) to the at least one annular groove (23) in the outer surface of the inner lining (3) consists of a generally corresponding annular rib (25) on the inner surface of the lock ring (16).

3. A flexible pressure pipe according to claim 1, wherein the engagement means for attaching the lock ring (16) to the at least one annular groove (23) in the outer surface of the inner lining (3) consists of an opposing groove (28) in the inner surface of the lock ring (16) and a circlip (29) which is fitted into both grooves (23;28).

4. A flexible pressure pipe according to claim 1, wherein the at least one annular groove (23) in the outer surface of the inner lining (3) is formed by rolling.

5. A flexible pressure pipe according to claim 1, wherein the cross-section of the at least one annular groove (23) in the outer surface of the inner lining (3) is formed substantially as a segment of circle.

6. A flexible pressure pipe according to claim 1, wherein the depth of the at least one annular groove (23) in the outer surface of the inner lining (3) is between 0.2–0.5 times the thickness of the lining (3).

7. A flexible pressure pipe according to claim 1, wherein the lock ring (16) has a transverse slit or consists of two or more sectors of circle.

8. A flexible pressure pipe according to claim 1, wherein the lock ring (16) is fitted into a holding groove (16) in the wall of the through opening (14) of the end-fitting (9).

9. A flexible pressure pipe according to claim 8, wherein there is a gap between the lock ring (16) and the holding groove (17), and that this gap is filled with a casting material (18), e.g. a polymer such as epoxy.

10. A method for assembling a flexible pressure pipe with an associated end-fitting (9) having an axially extending through opening (14), where the pipe is of a non-bonded structure comprising of a number of layers including an extruded polymer inner lining (3) extending into the through opening (14), wherein the method comprises, removing the layers surrounding the lining (3) at an end of the pipe, rolling at least one annular groove (17) in the outer surface of the end part of the inner lining, placing a lock ring (16) consisting of two or more sectors of a circle around the end part of the lining (3) such that a rib (25) on the lock ring (16), or a circlip (29) which engages a groove (28) in the lock ring (16), engages the groove (23) rolled in the outer surface of the end part of the lining, securing the lock ring sectors, and attaching the lock ring (16) to the end-fitting (9).

* * * * *